US008315317B2

(12) United States Patent
Maeda et al.

(10) Patent No.: US 8,315,317 B2
(45) Date of Patent: *Nov. 20, 2012

(54) RADIO COMMUNICATION SYSTEM, TRANSMITTER, RECEIVER AND RADIO COMMUNICATING METHOD

(75) Inventors: Noriyuki Maeda, Yokohama (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 787 days.

This patent is subject to a terminal disclaimer.

(21) Appl. No.: 12/391,706

(22) Filed: Feb. 24, 2009

(65) Prior Publication Data

US 2009/0161733 A1 Jun. 25, 2009

Related U.S. Application Data

(62) Division of application No. 11/020,192, filed on Dec. 27, 2004, now Pat. No. 7,526,011.

(30) Foreign Application Priority Data

Dec. 25, 2003 (JP) ................................. 2003-430550

(51) Int. Cl.
*H04K 1/10* (2006.01)
*H04L 27/28* (2006.01)
(52) U.S. Cl. ........................................ 375/260; 375/141
(58) Field of Classification Search .................... 375/260
See application file for complete search history.

(56) References Cited

U.S. PATENT DOCUMENTS

| 5,610,908 A | 3/1997 | Shelswell et al. |
|---|---|---|
| 5,646,935 A | 7/1997 | Ishikawa et al. |
| 5,907,563 A | 5/1999 | Takeuchi et al. |
| 6,188,717 B1 | 2/2001 | Kaiser et al. |
| 7,289,459 B2 | 10/2007 | Hayashi et al. |
| 2002/0159425 A1 | 10/2002 | Uesugi et al. |
| 2004/0028004 A1 | 2/2004 | Hayashi et al. |
| 2004/0165675 A1 | 8/2004 | Ito et al. |
| 2004/0196780 A1 | 10/2004 | Chin et al. |
| 2004/0199846 A1 | 10/2004 | Matsumoto et al. |

FOREIGN PATENT DOCUMENTS

AU 1675856 A 9/2005

(Continued)

OTHER PUBLICATIONS

Nathan Yee, et al., "Multi-Carrier CDMA in Indoor Wireless Radio Networks", IEEE Personal and Indoor Mobile Radio Communicatin, 1993, pp. 109-113.

(Continued)

*Primary Examiner* — David C. Payne
*Assistant Examiner* — Tanmay Shah
(74) *Attorney, Agent, or Firm* — Oblon, Spivak, McClelland, Maier & Neustadt, L.L.P.

(57) ABSTRACT

A radio communication system having a radio transmitter and a radio receiver and adopting multiple carrier modulation and code spreading modulation methods is disclosed. The radio communication system comprises a selecting unit provided in the radio transmitter or the radio receiver, for selecting an interleaving mode out of plural interleaving modes depending on radio propagation path conditions; a symbol configuration unit provided in the radio transmitter; and a symbol reconfiguration unit provided in the radio receiver. The symbol configuration unit configures information symbols to be transmitted by the radio transmitter in both time and frequency directions in a pattern according to the interleaving mode selected by the selecting unit, and the symbol reconfiguration unit reconfigures information symbols received by the radio receiver in both time and frequency directions in an inverse pattern of the pattern.

9 Claims, 8 Drawing Sheets

FOREIGN PATENT DOCUMENTS

| | | |
|---|---|---|
| EP | 1 059 787 A1 | 12/2000 |
| EP | 1 271 873 A2 | 1/2003 |
| JP | 11-163823 | 6/1999 |
| JP | 2001-60934 | 3/2001 |
| JP | 2002-190788 | 7/2002 |
| JP | 2003-8535 | 1/2003 |
| JP | 2003-244092 | 8/2003 |
| JP | 2003-258766 | 9/2003 |
| JP | 2003-309535 | 10/2003 |

OTHER PUBLICATIONS

Sigit P.W. Jarot, et al., "Evaluation of Frequency Interleaving Effects in Convolutional Coded OFDM System for Broadband Mobile Communication", IEEE ICT 2001, Jun. 2001, pp. 443-448.

Van Duc Nguyen, et al., "Block Interleaving for soft decision Viterbi decoding in OFDM Systems", IEEE VTC2001-Fall, Sep. 2001, pp. 470-474.

Sai-Weng Lei, et al., "Performance Analysis of Adaptie Interleaving for OFDM System", IEEE Transactions on Vehicular Technology, vol. 51, No. 3. May 2002, pp. 435-444.

Noriyuki Maeda, et al., "Variable Spreading Factor—OFCDM with Two Dimensional Spreading that Prioritizes Time Domain Spreading for Forward Link Broadband Wireless Access", VTC 2003-Spring. The 57$^{Th}$. IEEE Semiannual Vehicular Technology Conference, vol. 4 of 4, Conf. 57, XP-010862113, Apr. 22, 2003, pp. 127-132.

Stefan Kaiser, "OFDM Code-Division Multiplexing in Fading Channels", IEEE Transactions on Communications, vol. 50, No. 8, XP-011070978, Aug. 2002, pp. 1266-1273.

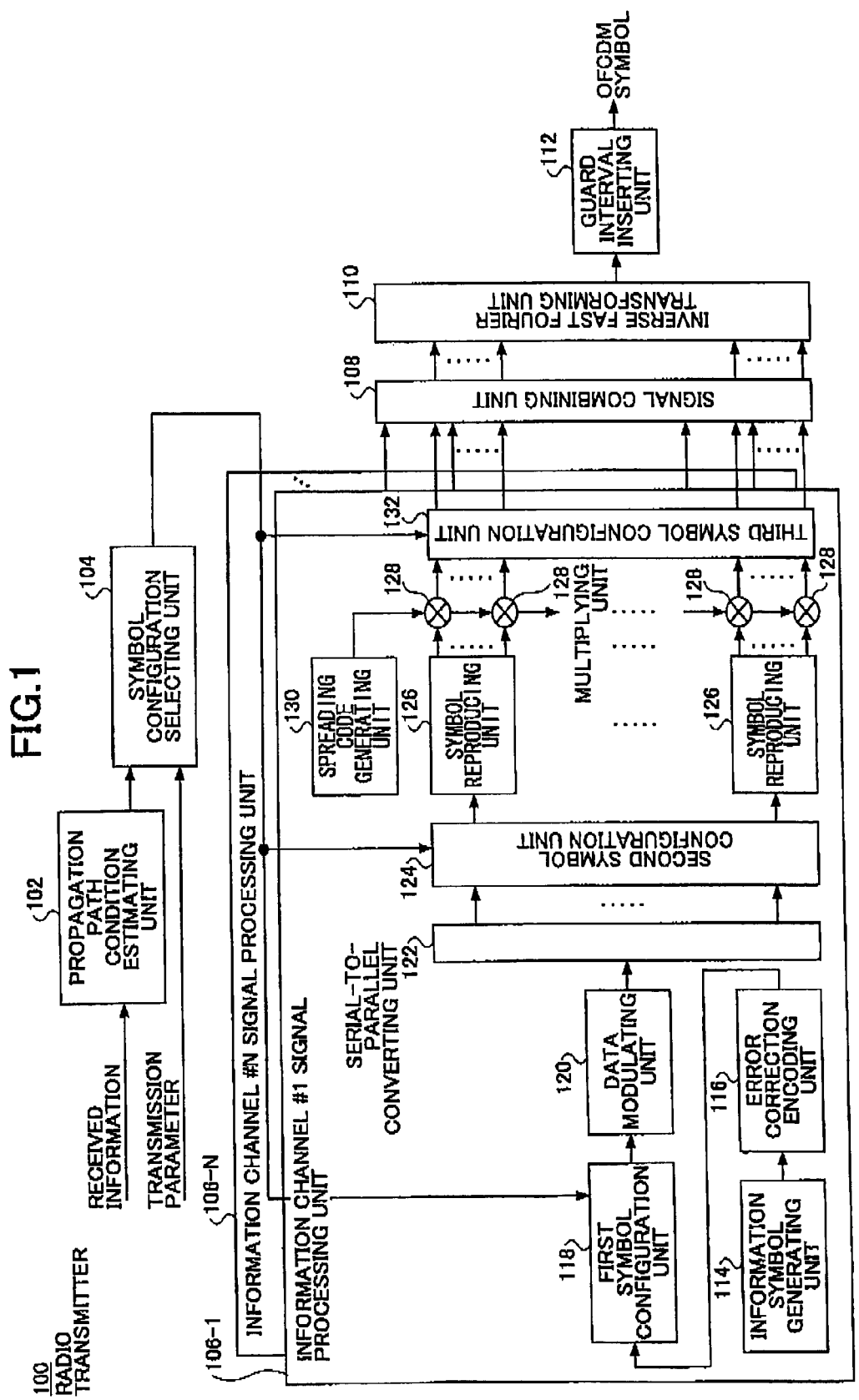

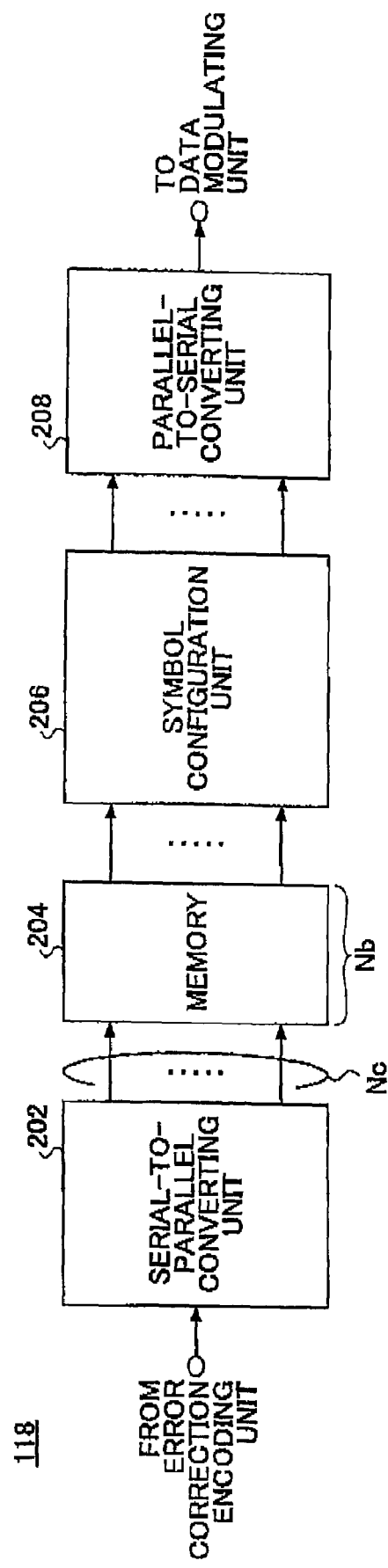

FIG.8
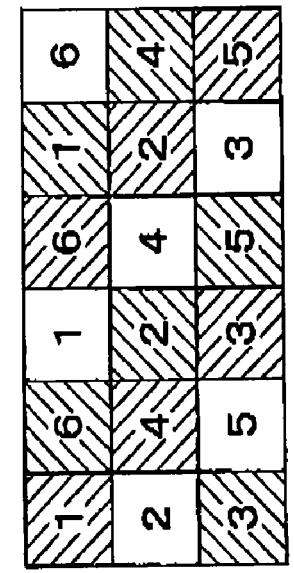
(AFTER INTERLEAVING)
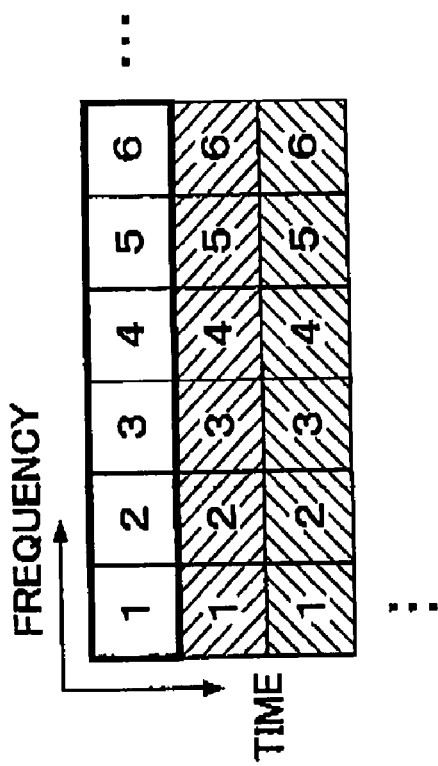
(BEFORE INTERLEAVING)

RADIO COMMUNICATION SYSTEM, TRANSMITTER, RECEIVER AND RADIO COMMUNICATING METHOD

CROSS REFERENCE TO RELATED APPLICATIONS

This application is a continuation of and is based upon and claims the benefit of priority under 35 U.S.C. §120 for U.S. Ser. No. 11/020,192, filed Dec. 27, 2004, and claims the benefit of priority under 35 U.S.C. §119 from Japanese Patent Application No. 2003-430550, filed Dec. 25, 2003, the entire contents of each which are incorporated herein by reference.

BACKGROUND OF THE INVENTION

The present invention generally relates to radio communication systems, and more particularly, to a radio communication system, a radio transmitter, a radio receiver, and a radio communicating method in which two dimensional interleaving is performed on information symbols in frequency and time axis directions.

In this technical field, OFDM (Orthogonal Frequency Division Multiple access) systems and CDMA (Code Division Multiple Access) systems are promising. The CDMA system distinguishes channels by orthogonal codes to improve interference endurance. The OFDM system selects plural sub-carriers which are orthogonal to each other to improve fading endurance and interference between symbols while effectively utilizing a bandwidth. An OFCDM (Orthogonal Frequency and Code Division Multiplexing) system or a multi-carrier CDMA (MC-CDMA) system that combines the above technologies is known.

In the OFCDM system, information symbols are distinguished by orthogonal spread codes and transmitted on plural sub-carriers. In a radio receiver, necessary information symbols are extracted based on the orthogonality of the spread codes, and recovered by each sub-carrier for demodulation. Accordingly, in order to demodulate in good shape, it is required to maintain the orthogonality between spread codes. However, in a mobile communications system environment, the orthogonality between information symbols may be disturbed because received signal amplitudes or phases representing information symbols are deformed due to the change of propagation path or communication environment. Because of the disturbance of the orthogonality, interference signal components become larger so as to degrade received signal quality, which is a problem.

An "interleaving" technique is known for suppressing the above problem. In this technique, information symbols are rearranged or configured in a pattern before transmitting, and received information symbols are further rearranged or reconfigured in an inverse pattern of the above pattern in a receiver, in order to disperse signal degradation risks and recover the transmitted information symbols accurately. By rearranging the information symbols in frequency axis direction or time axis direction, it is expected to suppress the continuous reception of unreliable signal sequences. This interleaving technology is described in Japanese Laid-Open Patent Application 2002-190788. A two dimensional interleaving technique having a larger interleaving effect is described in Japanese Laid-Open Patent Application 2003-8535.

A radio communication environment is constantly changed over time, and the prior interleaving techniques cannot deal with such constant change in the radio communication environment. In some communication environments, the interleaving method or OFCDM system does not provide the expected result or advantage. As a mobile terminal moves with higher speed and used radio frequencies become higher, such radio communication environmental changes will be more drastic, resulting in significantly degraded signal quality.

SUMMARY OF THE INVENTION

A general object of the present invention is to provide a radio communication system, a radio receiver, a radio transmitter and a radio communicating method having improved signal quality in the OFCDM system performing two dimensional interleaving in frequency and time domains.

The above object of the present invention is achieved by a radio communication system having a radio transmitter and a radio receiver and adopting multiple carrier modulation and code spreading modulation methods, comprising: a selecting unit provided in the radio transmitter or the radio receiver, for selecting an interleaving mode out of a plurality of interleaving modes depending on radio propagation path conditions; a symbol configuration unit provided in the radio transmitter; and a symbol reconfiguration unit provided in the radio receiver; whereby the symbol configuration unit configures information symbols to be transmitted by the radio transmitter in both time and frequency directions in a pattern according to the interleaving mode selected by the selecting unit, and the symbol reconfiguration unit reconfigures information symbols received by the radio receiver in both time and frequency directions in an inverse pattern of the pattern.

The above object of the present invention is achieved by a radio transmitter in a radio communication system adopting multiple carrier modulation and code spreading modulation methods, comprising: a selecting unit for selecting an interleaving mode out of a plurality of interleaving modes depending on radio propagation path conditions; and a symbol configuration unit for configuring information symbols to be transmitted in both time and frequency directions in a pattern according to the interleaving mode selected by the selecting unit.

The above object of the present invention is achieved by a radio receiver in a radio communication system adopting multiple carrier modulation and code spreading modulation methods, comprising: a selecting unit for selecting an interleaving mode out of a plurality of interleaving modes depending on radio propagation path conditions; a notifying unit for notifying a radio transmitter of the selected interleaving mode; and a symbol reconfiguration unit for receiving from the radio transmitter, information symbols that have been configured in both frequency and time directions in a pattern according to the selected interleaving mode, configuring information symbols to be transmitted by the radio transmitter in both time and frequency directions in a pattern according to the interleaving mode selected by the selecting unit, and reconfiguring the received information symbols in both time and frequency directions in an inverse pattern of the pattern.

The above object of the present invention is achieved by a radio communicating method in a radio communication system adopting multiple carrier modulation and code spreading modulation methods, comprising: a measuring step for measuring radio propagation path conditions in a radio receiver or a radio transmitter; a selecting step, in the radio transmitter or the radio receiver, for selecting an interleaving mode out of a plurality of interleaving modes based on the measured result; a transmitting step for configuring information symbols in both time and frequency directions in a pattern according to the selected interleaving mode, and transmitting the configured information symbols; and a receiving step, in the radio receiver, for receiving the transmitted information symbols; a demodulation step for reconfiguring the received information symbols in both time and frequency directions in an inverse pattern of the pattern.

According to embodiments of the present invention, signal quality can be improved in OFCDM radio communication systems that perform two dimensional interleaving in frequency and time domains.

BRIEF DESCRIPTION OF THE DRAWINGS

FIG. 1 is a block diagram of a radio transmitter according to an embodiment of the present invention;

FIG. 2 is a block diagram of a first symbol configuration unit;

FIG. 8 illustrates data blocks before and after interleaving.

DESCRIPTION OF THE PREFERRED EMBODIMENTS

Figure 3A:
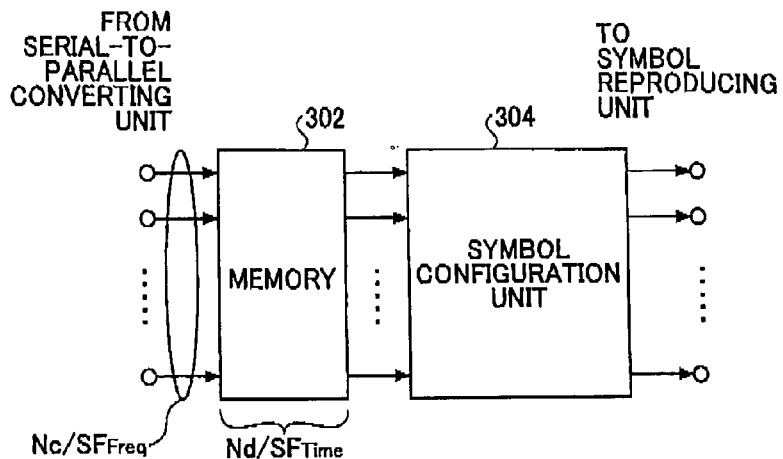
FIGS. 3A-C are block diagrams of a second symbol configuration unit.

The following is a description of embodiments of the present invention, with reference to the accompanying drawings.

FIG. 1 is a block diagram of a radio transmitter according to an embodiment of the present invention. It should be noticed that FIG. 1 shows only major functional elements relating to the present invention, among elements required in a radio transmitter for an OFCDM radio communications system. The radio transmitter 100 forms information symbols including contents to be transmitted per N information channels, combines them and adds guard intervals to form OFCDM symbols. The radio transmitter 100 comprises a propagation path condition estimating unit 102, a symbol configuration selecting unit 104, N signal processing units 106-1~N, a signal combining unit 108, an inverse fast Fourier transforming unit (IFFT unit) 110, and a guard interval inserting unit 112.

Each of the N signal processing units has the same structure and function, and therefore only the signal processing unit 106-1 is explained as a representative. The signal processing unit 106-1 comprises an information symbol generating unit 114, an error correction encoding unit 116, a first symbol configuration unit 118, a data modulating unit 120, a serial-to-parallel converting unit 122, a second symbol configuration unit 124, a plurality of symbol reproducing units 126, a plurality of multiplying units 128, a spreading code generating unit 130, and a third symbol configuration unit 132.

The propagation path condition estimating unit 102, based on a control channel (received information) received by the radio transmitter 100, measures parameters regarding propagation path conditions. These parameters may include delay profiles or delay spreading characteristics due to multipath fading, Maximum Doppler frequency due to relative motion between a transmitter and a receiver, and so on.

The symbol configuration selecting unit 104, based on the measured results of the propagation path condition estimating unit 102 and given parameters, selects or determines a desired symbol configuration or a desired interleave mode. The given parameters may include modulation modes such as QPSK or 16 QAM, error correction coding rates, spreading factors, channel coding rates, code multiplicities per channel, and so on. The interleave modes to be selected may include, for example, a bit interleave, a symbol interleave, a coordinate interleave, a chip interleave, and so on. Each of these interleave modes is explained below.

(1) Bit Interleaving

This is an interleaving mode in which interleaving is carried out per bit constituting an information symbol. Since the interleaving is done before the information symbol is spread, this mode can interleave while maintaining the orthogonality between codes.

(2) Symbol Interleaving

This is an interleaving mode in which the interleaving is done per information symbol. Since the interleaving is also done before the information symbol is spread, this mode can interleave while maintaining the orthogonality between codes. Since the interleaving is done per information symbol, this mode has less interleaving effect (error correction capabilities) than the bit interleaving, but its operational loads or circuit structures are easier compared with the bit interleaving.

(3) Coordinate Interleaving

This mode is a symbol interleaving mode in which an in-phase component (I) and a quadrature component (Q) adopt different patterns. Both the in-phase component and the quadrature component are symbol-interleaved, but their interleaving patterns are different from each other. This mode can reduce errors occurring in the in-phase and quadrature components at the same time.

(4) Chip Interleaving

This mode is an interleaving mode in which the interleaving is done per chip. Since the interleaving is done per a unit smaller than one bit, a very large interleaving effect can be obtained. However, since the interleaving is done after the information symbols are spread, this mode tends to easily collapse the orthogonality between codes.

The information symbol generating unit 114 generates information symbols to be transmitted.

The error correction encoding unit 116 performs predetermined coding such as turbo coding or convolution coding on the information symbols. Since a radio receiver can utilize knowledge about these codes when decoding them, errors introduced in propagation paths can be detected and corrected.

The first symbol configuration unit 118 is an element that performs the bit interleaving. If the symbol configuration selecting unit 104 selects the bit interleaving, as shown in FIG. 8, the information symbols are rearranged or configured in a certain pattern, with respect to time axis direction and frequency axis direction. A block enclosed with a thick frame shown in FIG. 8 represents one information symbol, and each block ("1" through "6") therein represents a bit. In the information symbols before interleaving shown at the left side of FIG. 8, three information symbols comprising six bits are arranged in order of time. In the information symbols after interleaving shown at the right side of FIG. 8, bits constituting each information symbol are rearranged or configured in frequency axis direction and time axis direction. As explained later, each block "1" through "6" may be a variety of kinds of information units depending on interleaving modes. That is, each block represents a bit in the bit interleaving mode, a symbol in the symbol interleaving mode, and a chip in the chip interleaving mode.

FIG. 2 is a functional block diagram showing the first symbol configuration unit 118 in more detail. As shown in FIG. 2, the first symbol configuration unit 118 comprises a serial-to-parallel converting unit 202, a memory 204 of a predetermined size, a symbol configuration unit 206, and a parallel-to-serial converting unit 208. The predetermined size may be $N_c \times N_b$, for example, wherein $N_c$ means the number of sub-carriers and $N_b$ means the number of bits included in one symbol.

The first symbol configuration unit 118, according to instructions from the symbol configuration selecting unit 104, performs symbol interleaving in time axis direction and/or frequency axis direction. When interleaving in any direction, input signal sequences are stored in the memory 204 and output and rearranged or configured in an adequate pattern by the symbol configuration unit 206 to interleave the signals. The serial-to-parallel converting unit 202 and the parallel-to-serial converting unit 208 can be omitted.

The data modulating unit 120 shown in FIG. 1 modulates error corrected information symbols in accordance with a predetermined modulation mode such as QPSK or 16QAM.

The serial-to-parallel converting unit 122 converts the signal sequences output from the data modulating unit 120 into a predetermined number of parallel signal sequences. This predetermined number is defined by the number of sub-carriers divided by a spreading rate.

The second symbol configuration unit 124 is an element that performs the symbol interleaving. If the symbol configuration selecting unit 104 selects the symbol interleaving as an adequate interleaving mode, the second symbol configuration unit 124 performs the symbol interleaving on the parallel signals output from the serial-to-parallel converting unit 122. In the symbol interleaving mode, each block "1" through "6" shown in FIG. 8 represents a symbol.

Figure 3B:
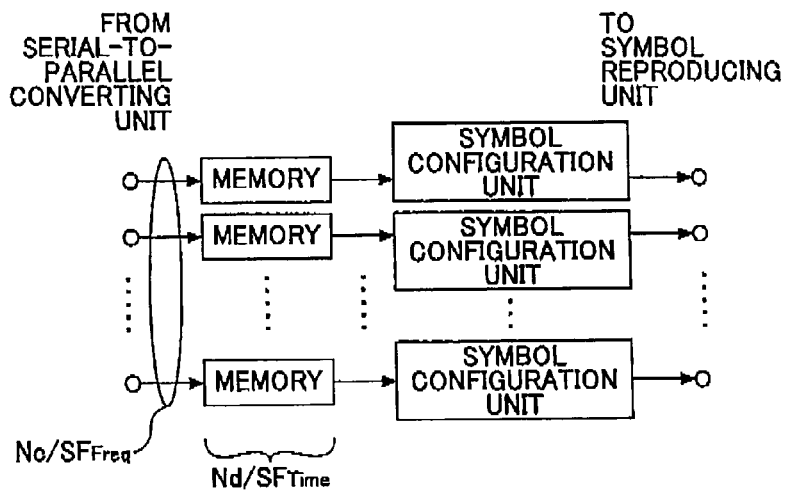
Figure 3C:
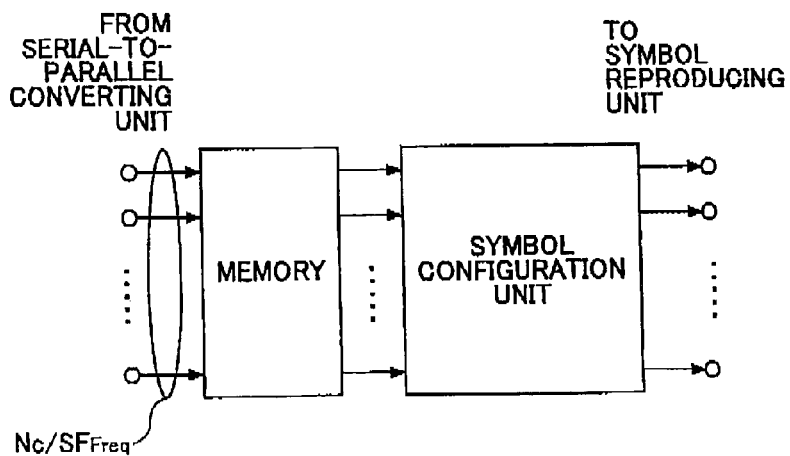

FIGS. 3A-C are functional block diagrams regarding the second symbol configuration unit 124. As shown in FIG. 3A, the second symbol configuration unit 124 comprises a memory 302 of a predetermined size, and a symbol configuration unit 304. The predetermined size is defined by the number of symbols in one frame and the number of the parallel signals from the serial-to-parallel converting unit, and may be $N_c/SF_{Freq} \times N_d/SF_{Time}$, for example, wherein $N_c$ means the number of sub-carriers, $N_d$ means the number of OFCDM symbols included in one frame, $SF_{Freq}$ means a spreading rate in frequency domain, and $SF_{Time}$ means a spreading rate in time domain.

The second symbol configuration unit 124, according to instructions from the symbol configuration selecting unit 104, performs symbol interleaving in time axis direction and/or frequency axis direction. When interleaving in any direction, input signal sequences are stored in the memory 302 and output and rearranged or configured in an adequate pattern by the symbol configuration unit 304 to interleave the signals.

FIG. 3B shows a concept of performing the interleaving in time axis direction. As shown in FIG. 3B, the signal sequences stored in the memory are rearranged or configured in an adequate pattern in time axis direction to interleave in the time axis direction.

FIG. 3C shows a concept of performing the interleaving in frequency axis direction. As shown in FIG. 3C, the signal sequences stored in the memory are rearranged or configured in an adequate pattern in frequency axis direction to interleave in the frequency axis direction. It is of course possible to combine the time axis direction interleaving and the frequency axis direction interleaving.

Figure 4A:
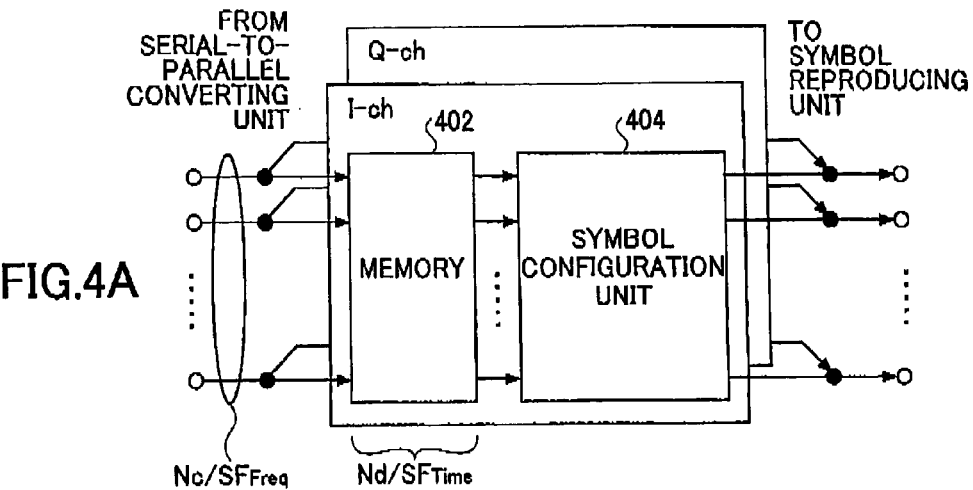
FIGS. 4A-C are another block diagrams of a second symbol configuration unit.
Figure 4B:
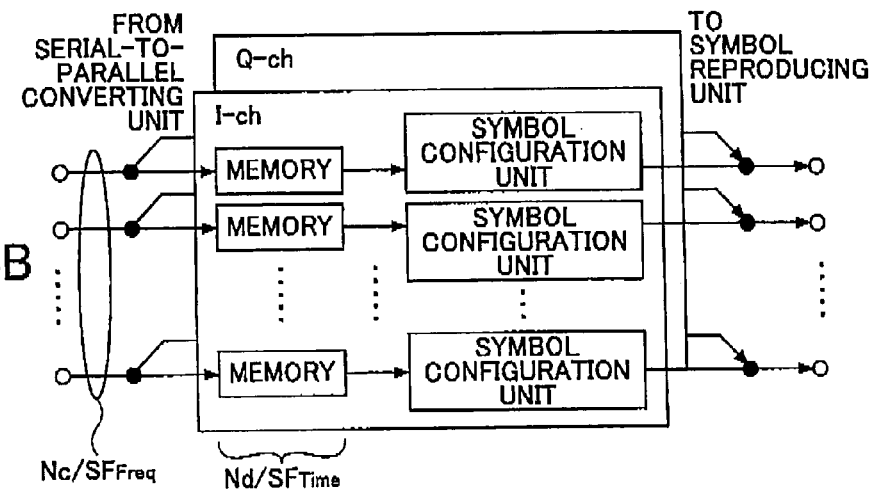
Figure 4C:
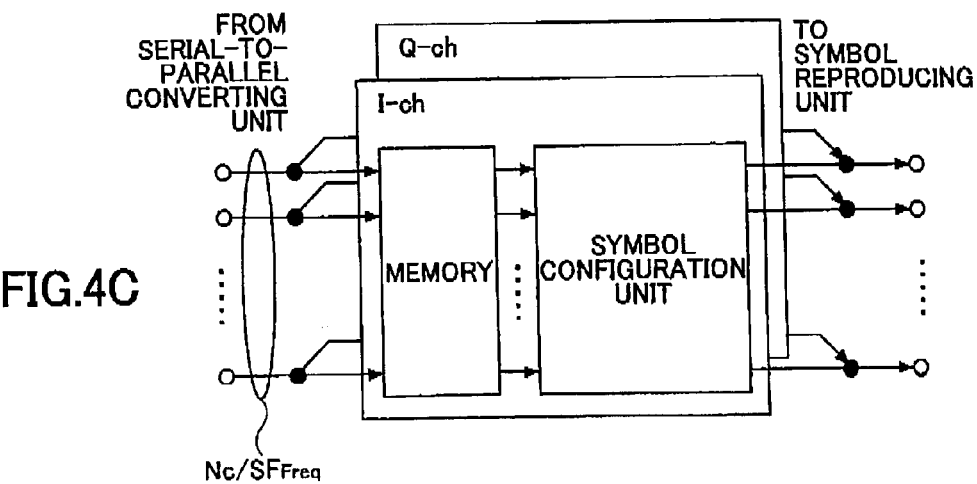

FIGS. 4A-C are functional block diagrams of the second symbol configuration unit 124 in more detail. FIGS. 4A-C show the coordinate interleaving. The structures and operations in FIGS. 4A-C are similar to those in FIGS. 3A-C except that the in-phase component (I) and the quadrature component (Q) are separately symbol-interleaved.

The symbol reproducing unit 126 reproduces the signals from the second symbol configuration unit 124 coinciding with length or period of spreading codes generated by the spreading code generating unit 130.

The multiplying unit 128 code spreads the signal sequences by multiplying outputs from the symbol reproducing units 126 with the spreading codes from the spreading code generating unit 130.

The third symbol configuration unit 132 is an element that performs the chip interleaving. If the symbol configuration selecting unit 104 selects the chip interleaving as an adequate interleaving mode, the third symbol configuration unit 132 performs the chip interleaving on the parallel signals output from the symbol reproducing units 126 (multiplying units 128). In the chip interleaving mode, each block "1" through "6" shown in FIG. 8 represents a chip.

Figure 5A:
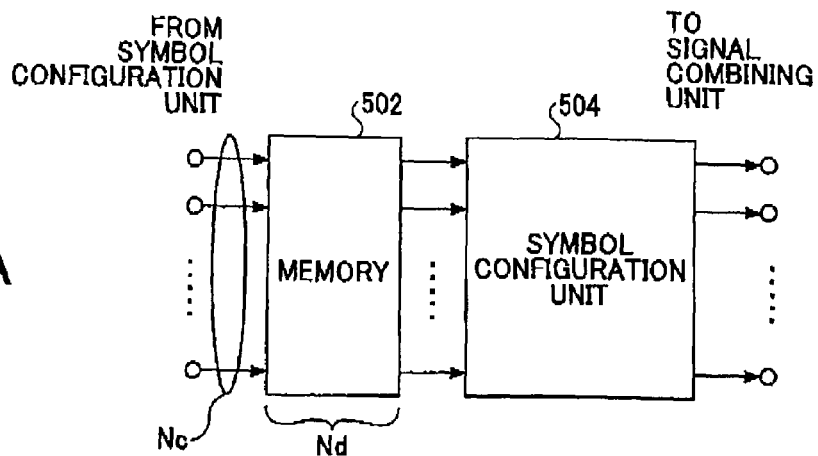
FIGS. 5A-C are block diagrams of a third symbol configuration unit.
Figure 5B:
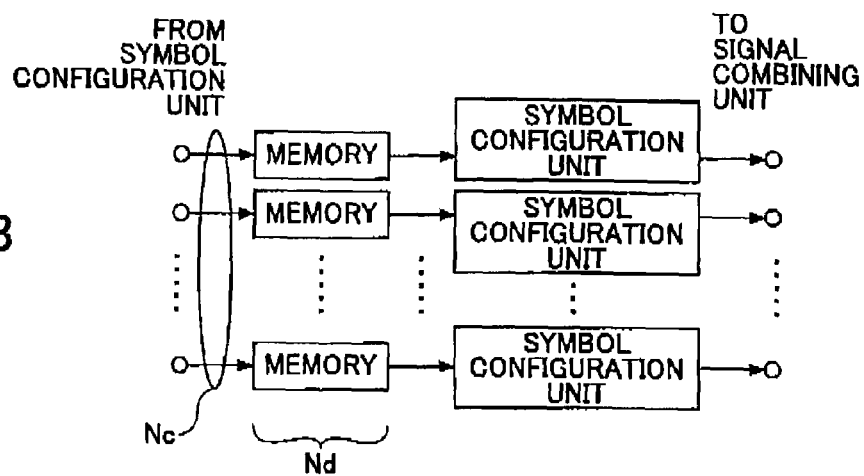
Figure 5C:
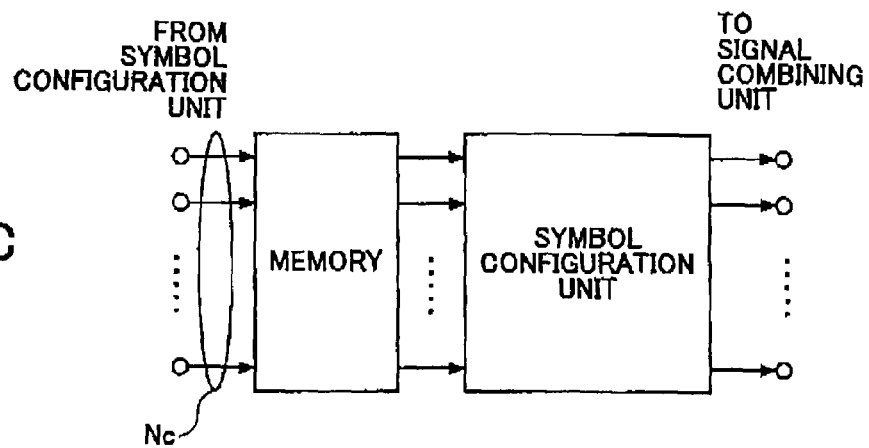

FIGS. 5A-C are functional block diagrams regarding the third symbol configuration unit 132. As shown in FIG. 5A, the third symbol configuration unit 132 comprises a memory 502 of a predetermined size, and a symbol configuration unit 504. The predetermined size is defined by the number of symbols in one frame and the number of the parallel signals from the symbol reproducing units 126, and may be $N_c \times N_d$, for example, wherein $N_c$ means the number of sub-carriers and $N_d$ means the number of OFCDM symbols included in one frame.

The third symbol configuration unit 132, according to instructions from the symbol configuration selecting unit 104, performs symbol interleaving in time axis direction and/or frequency axis direction. When interleaving in any direction, input signal sequences are stored in the memory 502 and output and rearranged or configured in an adequate pattern by the symbol configuration unit 504 to interleave the signals.

FIG. 5B shows a concept of performing the interleaving in time axis direction. As shown in FIG. 5B, the signal sequences stored in the memory are rearranged or configured in an adequate pattern in time axis direction to interleave in the time axis direction.

FIG. 3C shows a concept of performing the interleaving in frequency axis direction. As shown in FIG. 3C, the signal sequences stored in the memory are rearranged or configured in an adequate pattern in frequency axis direction to interleave in the frequency axis direction. It is of course possible to combine the time axis direction interleaving and the frequency axis direction interleaving.

Turning back to FIG. 1, the signal combining unit 108 combines or synthesizes the information output from each information channel 1 through N per sub-carrier.

The IFFT unit 110 performs inverse fast Fourier transformation on the combined or synthesized signal sequences and converts the frequency domain signals to time domain signals to modulate them by the OFDM method. Guard intervals are added or inserted to the time domain signals at the guard interval inserting unit 112 to form OFCDM symbols.

As understood by a person skilled in the art, it is not necessary for the present invention to perform the interleaving processing at the first, second and third symbol configuration units 118, 124 and 132 at the same time. Depending on determination in the symbol configuration selecting unit 104, symbol configuration to be used and symbol configuration contents on the time axis and the frequency axis are determined.

Figure 6:
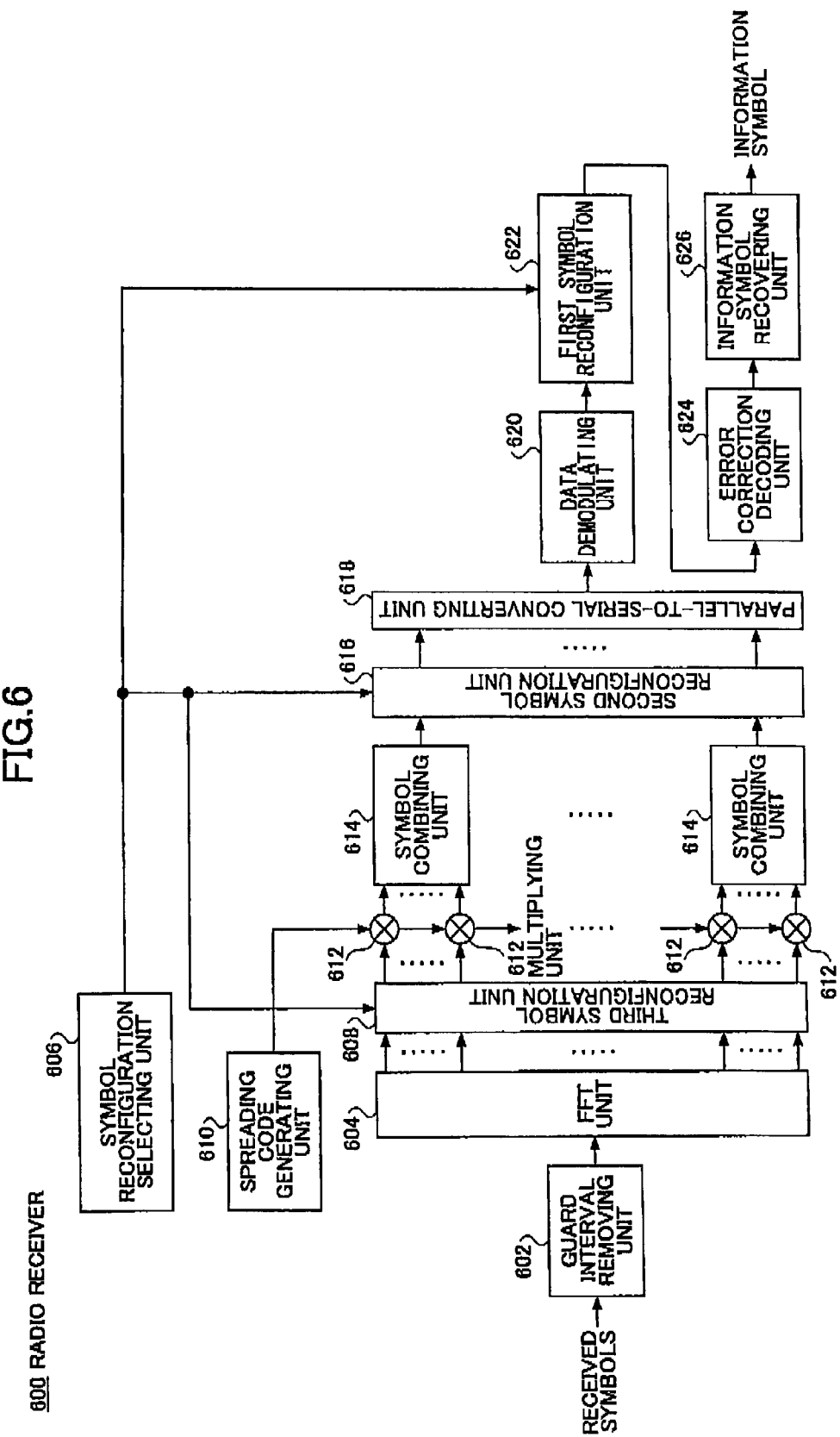
FIG. 6 is a block diagram of a radio receiver according to another embodiment of the present invention.

FIG. 6 is a block diagram of a radio receiver according to another embodiment of the present invention. It should be noticed that FIG. 6 shows only major functional elements relating to the present invention, among elements required in a radio receiver for an OFCDM radio communications system. The radio receiver 600 comprises a guard interval removing unit 602, a FFT unit 604, a symbol reconfiguration selecting unit 606, a third symbol reconfiguration unit 608, a spreading code generating unit 610, a plurality of multiplying units 612, a plurality of symbol combining units 614, a second symbol reconfiguration unit 616, a parallel-to-serial converting unit 618, a data demodulating unit 620, a first symbol reconfiguration unit 622, an error correction decoding unit 624, and an information symbol recovering unit 624.

The guard interval removing unit 602 removes guard intervals from OFCDM symbols received by the radio receiver 600 to extract information symbols.

The FFT unit 604 performs fast Fourier transformation on the information symbols and converts them to parallel signal sequences per sub-carrier.

The symbol reconfiguration selecting unit 606, based on a control channel transmitted from the radio transmitter, determines which interleaving mode has been performed on the received OFCDM symbols. In another words, the radio transmitter notifies, via the control channel, the radio receiver of information indicating which interleaving mode has been performed on the OFCDM symbols.

The third symbol reconfiguration unit 608 is an element that performs chip de-interleaving (the inverse operation of the chip interleaving). If the symbol reconfiguration selecting unit 606 determines that the received information symbols have been chip interleaved, the third symbol reconfiguration unit 608 rearranges or reconfigures the Fourier transformed signals per sub-carrier in the inverse pattern of the chip interleaving pattern. Similar to the third symbol configuration unit 132 shown in FIG. 1, the third symbol reconfiguration unit 608 may comprise a memory and symbol reconfiguration unit.

The spreading code generating unit 610 generates predetermined spreading codes for de-spreading.

The multiplying unit 612 multiplies signals per sub-carrier with the spreading codes to perform de-spreading.

Each of the symbol combining units 614 combines or synthesizes a predetermined number of de-spread signal sequences into one.

The second symbol reconfiguration unit 616 is an element that performs symbol de-interleaving (the inverse operation of the symbol interleaving) or coordinate de-interleaving (the inverse operation of the coordinate interleaving). If the symbol reconfiguration selecting unit 606 determines that the received information symbols have been symbol interleaved, the second symbol reconfiguration unit 616 rearranges or reconfigures the signals from the symbol combining units 614 in the inverse pattern of the performed symbol interleaving pattern. Similar to the second symbol configuration unit 124 shown in FIG. 1, the second symbol reconfiguration unit 616 may comprise a memory and symbol reconfiguration unit.

The parallel-to-serial converting unit 618 converts parallel signal sequences into serial signal sequences.

The data demodulating unit 620 demodulates the converted serial signal sequences.

The first symbol reconfiguration unit 622 is an element that performs the bit de-interleaving (inverse operation of the bit interleaving). If the symbol reconfiguration selecting unit 606 determines that the received information symbols have been bit interleaved, the first symbol reconfiguration unit 616 rearranges or reconfigures the signals from the data demodulating unit 620 in the inverse pattern of the bit interleaving pattern. Similar to the first symbol configuration unit 118 shown in FIG. 1, the first symbol reconfiguration unit 622 may comprise a memory and symbol reconfiguration unit.

The error correction detecting unit 624 detects errors from the signal sequences and corrects them.

The information symbol recovering unit 626, based on the error corrected signal sequences, recovers the transmitted information symbols.

Figure 7:
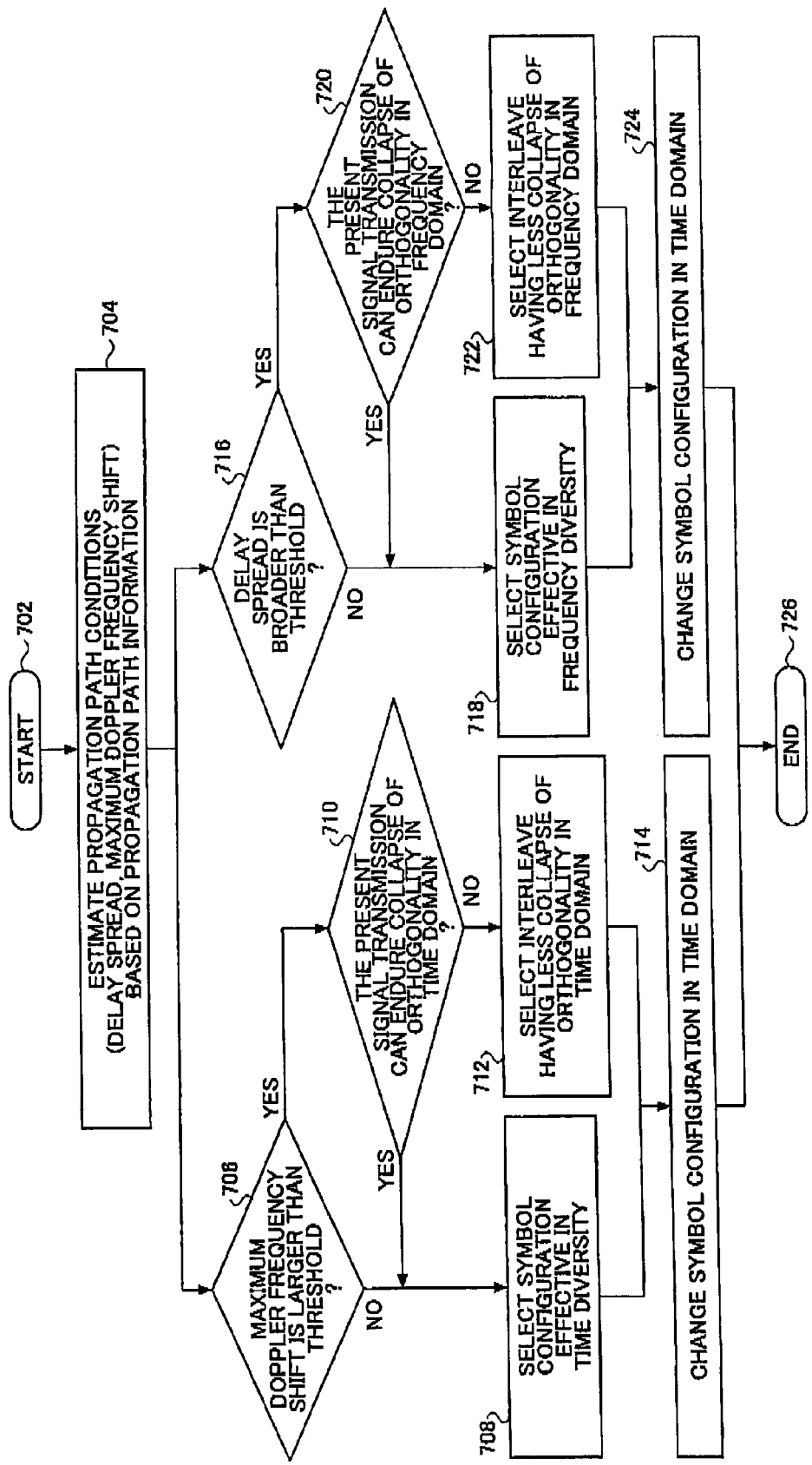
FIG. 7 is a flowchart showing a radio communication method according to an embodiment of the present invention.

FIG. 7 is a flowchart illustrating a procedure in the radio transmitter according to the embodiment of the present invention. In general, the procedure shown in this flowchart estimates propagation path conditions based on the received signal levels and SIR measurements and so on, and selects a desired interleaving mode in time axis direction and a desired interleaving mode in frequency axis direction, separately. Steps in the procedure shown in the flowchart are done mainly in the propagation path condition estimating unit 102, the symbol configuration selecting unit 104, and the first, second and third symbol configuration units 118, 124 and 132.

The procedure starts at step 702 and goes to step 704. At step 704, propagation path conditions are estimated based on the received signal levels and the received SINR and so on. The following explanation adopts the maximum Doppler frequency and the delay spread as parameters indicating the propagation path conditions, but other parameters can be adopted. However, from the viewpoint that relative motion (velocity) between the radio transmitter and the radio receiver is to be clearly grasped, it is desired to measure the maximum Doppler frequency. On the other hand, from the viewpoint of dealing with fading in the frequency domain due to variation in multi-propagation path lengths, it is desired to measure the delay spread.

At step 706, it is determined whether the estimated maximum Doppler frequency is larger than a predetermined threshold. If it is larger than the threshold, then the relative velocity between the radio transmitter and the radio receiver is large. If the estimated maximum Doppler frequency is smaller than the threshold, the relative velocity is small. In a case where the relative velocity is small, the signal level variation with respect to time due to the relative motion is insignificant; as a result, the signal transmission characteristics with respect to time are believed to be good.

A variety of parameters are possible as a parameter evaluating the maximum Doppler frequency, for example, a fading correlation value ρ as shown by the following equation can be used:

$$\rho = J_0(2\pi SF \Delta T f_D)$$

wherein SF represents a code spreading rate, ΔT represents the time equivalent to OFCDM symbol length, and $f_D$ represents the maximum Doppler frequency. $J_0$ means the zero-th order in the first class Bessel function. According to this equation, the fading correlation value ρ becomes closer to 1 ($J_0(0)=1$) when the maximum Doppler frequency $f_D$ is small, and becomes closer to zero when the maximum Doppler frequency $f_D$ is large. It is possible to determine whether the maximum Doppler frequency $f_D$ is large or small, by checking whether the fading correlation value ρ is larger than the threshold Th=0.8.

In a case where the maximum Doppler frequency is smaller than the threshold, the procedure goes to step 708.

At step 708, an interleaving mode (symbol configuration) effective with respect to time domain is selected. That is, an interleaving mode having higher time diversity is selected. For example, the chip interleaving having large effect in time domain can be selected. As mentioned above, the chip interleaving has a large interleaving effect, but it tends to easily collapse the orthogonality. In the case of going to step 708, the signal transmission characteristics in time domain is good. Accordingly, even if the orthogonality is collapsed to some extent due to the time domain chip interleaving, it is believed that the collapse does not significantly degrade signal quality because of good transmission characteristics.

On the other hand, in a case where it is determined at step 706 that the relative velocity is large, the signal level variation is large over time, and as a result, it is likely that the orthogonality of spreading codes in time domain collapses. In this case, the procedure goes to step 710.

At step 710, it is determined whether the signal transmission under the present transmission parameters can endure the collapse of the spreading code orthogonality (can maintain desired signal quality). As the transmission parameters, modulation method, coding rates, spreading factors, channel coding rates, code multiplicities and so on are available.

An explanation is given taking QPSK and 16QAM modulation methods as examples. In the QPSK modulation method, one symbol is represented by two bits such as "01". In the 16QAM modulation method, one symbol is represented by four bits such as "0011". Accordingly, when transmitting signals with the same transmission power, required power per one bit is less in the 16QAM. Therefore, the QPSK modulation method has stronger error endurance and interference endurance than 16QAM method. Regarding the collapse of the spreading code orthogonality in time domain, it is likely that 16QAM modulation method degrades the transmission signal quality much more than the QPSK modulation method. That is, it is expected that the QPSK modulation method does not degrade the transmission signal quality as much as the 16QAM modulation method. It should be noticed that the endurances against the orthogonality collapsing in the exemplified modulation methods are relative, not absolute. For example, the 16QAM modulation method has stronger endurance compared with the 64QAM modulation methods. Generally, the larger the number of modulation variables is, the more the orthogonality collapse degrades the signal quality. Accordingly, in case where the number of variables is large, it can be determined that the signal transmission at present cannot endure the orthogonality collapse.

Similarly, the larger the channel coding rates or spreading factors are, the smaller the power per one bit is. The size of the channel coding rates is related to the signal transmission characteristics. If the transmission characteristics are good, irrespective of the collapse of the spreading code orthogonality in time domain to some extent, the transmission method at present may maintain the signal quality. However, if the transmission characteristics are not good, the collapse of spread coding orthogonality directly affects the transmission signal qualities. Therefore, in a case where the channel coding rates are larger, it can be determined that the present transmission cannot endure the orthogonality collapses.

Further, the number of multiple codes for a certain channel does relate to the signal transmission interference. Accordingly, if the interference is small and the transmission characteristics are good, the present transmission system can endure the collapse of the spreading code orthogonality in time domain. However, if not, the collapse of the spreading code orthogonality directly degrades the transmission signal quality. Therefore, it can be determined that the present signal transmission cannot endure the collapse of the orthogonality when the code multiplicity number is large.

The determination at step 710 can be done based on any one of these various parameters, or based on a combination of the transmission parameters. As an example, in case of the QPSK modulation method, if $C_{mux}/SF$ is larger than a threshold $Th_1=0.5$, it is determined that the orthogonality collapse is too large to maintain the signal transmission. If not, it may be determined that the signal quality can be maintained. $C_{mux}$ means a code multiplicity and SF means a code spreading rate. In case of the 16QAM or 64QAM modulation method, if $C_{mux}/SF$ is larger than a threshold $Th_2=0.25$, it is determined that the orthogonality collapse is too large to maintain the signal transmission. If not, it may be determined that the signal quality can be maintained. In multi-value modulation methods such as 16, 64QAM, the orthogonality collapse of the spreading codes badly affects signal degradation; in order to reflect which, the threshold $Th_2$ is defined to be smaller than the threshold $Th_1$. The values such as 0.5 or 0.25 are merely examples.

In a case where the present signal transmission is determined to endure the orthogonality collapse, the procedure goes to step 708, where the above mentioned process is performed. On the other hand, in a case where the present signal transmission is determined not to endure the orthogonality collapse, the procedure goes to step 712.

In step 712 an interleaving mode is selected that easily maintains the orthogonality with respect to time domain. That is, an interleaving mode is adopted from the viewpoint of not disturbing the orthogonality between codes rather than interleaving effect. For example, the bit interleaving or the symbol interleaving may be adopted rather than the chip interleaving that easily disturbs the orthogonality.

At step 714, in order to carry out the interleaving method selected at step 708 or 712, the first, second and third symbol configuration units 118, 124 and 132 are set.

The procedure goes to step 726, where the selection of the interleaving method with respect to time domain ends.

On the other hand, after step 704, this procedure goes to step 716 in parallel.

At step 716, it is determined whether the estimated delay spread is broader than a predetermined threshold. In a case where the delay spread is broader than the threshold, amplitude level variation with respect to frequency domain is significant. In a case where the delay spread is narrow, the amplitude level variation with respect to frequency domain is insignificant; as a result it is believed that the signal transmission characteristics in the frequency domain are good.

A variety of parameters are available for estimating the delay spread. For example, a fading correlation value ρ indicated by the following equation may be used for estimating the delay spread.

$$\rho=1/\{1+(2\pi SF\Delta f\sigma)^2\} \qquad \text{Equation 1}$$

wherein SF represents a code spreading rate, $\Delta f$ represents frequency interval between sub-carriers, and σ represents a delay spread. According to this equation, the fading correlation value ρ is in the range of 0~1. The fading correlation value ρ becomes closer to 1 when the delay spread σ is small, and becomes closer to zero when the delay spread σ is large. It is possible to determine whether the delay spread is large or small, by checking whether the fading correlation value ρ is larger than the threshold Th=0.8.

In a case where the delay spread is smaller than the predetermined threshold, the procedure goes to step 718.

At step 718 an interleaving mode (symbol configuration) having large interleaving effect with respect to frequency domain is selected. That is, an interleaving mode having large frequency diversity effect is selected. For example, the chip interleaving in a frequency domain having high error endurance may be adopted.

On the other hand, at step 716, in a case where it is determined that the delay spread is broader than the predetermined threshold, the signal level variation with respect to frequency domain is significant, and as a result, it is believed that the orthogonality of spreading codes in the frequency axis direction is easily disturbed (collapsed). In this case the procedure goes to step 720.

At step 720, it is determined whether the signal transmission under the presently adopted transmission parameters can endure the collapse of the spreading code orthogonality (can maintain desired signal quality). As the transmission parameters, modulation method, coding rates, spreading factors, channel coding rates, code multiplicities and so on are available.

An explanation is given taking QPSK and 16QAM modulation methods as examples. Even if the spreading code orthogonality collapses to some extent, the QPSK modulation method endures it, but the 16QAM modulation method directly leads to the transmission signal quality degradation. Therefore, it can be determined that the present signal transmission cannot endure the collapse of the orthogonality when the code multiplicity number is large.

The size of the channel coding rates is related to the signal transmission characteristics. If the transmission characteristics are good, irrespective of the collapse of the spreading code orthogonality in the frequency domain to some extent, the transmission method at present may maintain the signal quality. However, if the transmission characteristics are not good, the collapse of spread coding orthogonality directly affects the transmission signal qualities. Therefore, in a case where the channel coding rates are larger, it can be determined that the present transmission cannot endure the orthogonality collapses.

Further, the number of multiple codes for a certain channel does relate to the signal transmission interference. Accordingly, if the interference is small and the transmission characteristics are good, the present transmission system can endure the collapse of the spreading code orthogonality in frequency domain. However, if not, the collapse of the spreading code orthogonality directly degrades the transmission signal quality. Therefore, it can be determined that the present signal transmission cannot endure the collapse of the orthogonality when the code multiplicity number is large.

The determination at step 720 can be done based on any one of these various parameters, or based on a combination of the transmission parameters. As an example, in case of the QPSK modulation method, whether $C_{mux}/SF$ is larger than a threshold $Th_1=0.5$ is used for determining whether the orthogonality collapse is too large to maintain the signal transmission. In case of the 16QAM or 64QAM modulation method, if $C_{mux}/SF$ is larger than a threshold $Th_2=0.25$, it is determined that the orthogonality collapse is too large to maintain the signal transmission. If not, it may be determined that the signal quality can be maintained.

In a case where the present signal transmission is determined to endure the orthogonality collapse, the procedure goes to step 718, where the above mentioned process is performed. On the other hand, in a case where the present signal transmission is determined not to endure the orthogonality collapse, the procedure goes to step 722.

In step 722 an interleaving mode is selected that easily maintains the orthogonality with respect to frequency domain. That is, an interleaving mode is adopted from the viewpoint of not disturbing the orthogonality between codes rather than interleaving effect. For example, the bit interleaving or the symbol interleaving may be adopted rather than the chip interleaving that easily disturbs the orthogonality.

At step 724, in order to carry out the interleaving method selected at step 708 or 712, the first, second and third symbol configuration units 118, 124 and 132 are set.

The procedure goes to step 726, where the selection of the interleaving method with respect to frequency domain ends. Which interleaving modes have been selected at steps 714 and 724 is communicated to the radio receiver via a control channel. The radio receiver performs adequate de-interleaving and other signal processing based on the control channel contents to recover information symbols.

The estimation of propagation path conditions and the selection of interleaving modes are carried out in the radio transmitter for explanation purpose. However, either one or both can be carried out in the radio receiver. If these processes are done in the radio receiver, an estimation result or selection result should be communicated to the radio transmitter via the control channel.

As explained above, according to the embodiments of the present invention, since interleavings are done in frequency domain and time domain separately, higher interleaving effect can be obtained while maintaining the orthogonality between the spreading codes. For example, from the viewpoint of frequency domain, the orthogonality between codes should be maintained at the sacrifice of the interleaving effect, but in time domain there may be a case where the interleaving effect is large but the orthogonality does not collapse so much. In this case, the frequency domain may adopt an interleaving suitable for maintaining the orthogonality between codes, and the time domain may adopt an interleaving having a large interleaving effect, and therefore high quality signal transmission can be obtained.

The present application is based on Japanese Priority Application No. 2003-430550 filed on Dec. 25, 2003 with the Japanese Patent Office, the entire contents of which are hereby incorporated by reference.

What is claimed is:

1. A radio communication OFCDM system having a radio transmitter and a radio receiver and adopting multiple carrier modulation and code spreading modulation methods, comprising:
   a selecting unit provided in the radio transmitter or the radio receiver, for selecting an interleaving mode out of a plurality of interleaving modes depending on radio propagation path conditions;
   a symbol configuration unit provided in the radio transmitter; and
   a symbol reconfiguration unit provided in the radio receiver, wherein
   the symbol configuration unit configures information symbols to be transmitted by the radio transmitter in both time and frequency directions in a pattern according to the interleaving mode selected by the selecting unit,
   the symbol reconfiguration unit reconfigures information symbols received by the radio receiver in both time and frequency directions in an inverse pattern of the pattern,
   the selecting unit selects an interleaving mode based at least one measured result of maximum Doppler frequency and delay spread characteristics in the radio propagation paths,
   when the selecting unit selects an interleave mode based on the measured result of the maximum Doppler frequency in the radio propagation paths, the selecting unit selects a bit interleaving mode or a symbol interleaving mode when the maximum Doppler frequency is larger than a predetermined value, and a chip interleaving mode when the maximum Doppler frequency is smaller than the predetermined value, and when the selecting unit selects an interleave mode based on the measured result of the delay spread characteristics in the radio propagation paths, the selecting unit selects the bit interleaving mode or a symbol interleaving mode when the delay spread is larger than a predetermined value, and the chip interleaving mode when the delay spread is smaller than the predetermined value.

2. A radio transmitter in a radio communication OFCDM system adopting multiple carrier modulation and code spreading modulation methods, comprising:

a selecting unit for selecting an interleaving mode out of a plurality of interleaving modes depending on radio propagation path conditions; and a symbol configuration unit for configuring information symbols to be transmitted in both time and frequency directions in a pattern according to the interleaving mode selected by the selecting unit, wherein the selecting unit selects an interleaving mode based at least one measured result of maximum Doppler frequency and delay spread characteristics in the radio propagation paths, when the selecting unit selects an interleave mode based on the measured result of the maximum Doppler frequency in the radio propagation paths, the selecting unit selects a bit interleaving mode or a symbol interleaving mode when the maximum Doppler frequency is larger than a predetermined value, and a chip interleaving mode when the maximum Doppler frequency is smaller than the predetermined value, and when the selecting unit selects an interleave mode based on the measured result of the delay spread characteristics in the radio propagation paths, the selecting unit selects the bit interleaving mode or a symbol interleaving mode when the delay spread is larger than a predetermined value, and the chip interleaving mode when the delay spread is smaller than the predetermined value.

3. The radio communication OFCDM system as claimed in claim 1, wherein the selecting unit selects an interleaving mode using at least one of parameters including a modulation multi-value, a spreading factor, a channel coding rate and a code multiplicity.

4. The radio transmitter as claimed in claim 3, wherein the symbol configuration unit configures the information symbols in time direction in a pattern based on maximum Doppler frequency shift in the radio propagation paths.

5. The radio transmitter as claimed in claim 2, wherein the selecting unit selects an interleaving mode using at least one of parameters including a modulation multi value, a spreading factor, a channel coding rate and a code multiplicity.

6. The radio transmitter as claimed in claim 2, wherein the symbol configuration unit configures the information symbols in frequency direction in a pattern based on delay spread characteristics in the radio propagation paths.

7. A radio receiver in a radio communication OFCDM system adopting multiple carrier modulation and code spreading modulation methods, comprising:

a selecting unit for selecting an interleaving mode out of a plurality of interleaving modes depending on radio propagation path conditions;

a notifying unit for notifying a radio transmitter of the selected interleaving mode; and a symbol reconfiguration unit for receiving from the radio transmitter information symbols that have been configured in both frequency and time directions in a pattern according to the selected interleaving mode, configuring information symbols to be transmitted by the radio transmitter in both time and frequency directions in a pattern according to the interleaving mode selected by the selecting unit, and reconfiguring the received information symbols in both time and frequency directions in an inverse pattern of the pattern, wherein the selecting unit selects an interleaving mode based at least one measured result of maximum Doppler frequency and delay spread characteristics in the radio propagation paths, when the selecting unit selects an interleave mode based on the measured result of the maximum Doppler frequency in the radio propagation paths, the selecting unit selects a bit interleaving mode or a symbol interleaving mode when the maximum Doppler frequency is larger than a predetermined value, and a chip interleaving mode when the maximum Doppler frequency is smaller than the predetermined value, and when the selecting unit selects an interleave mode based on the measured result of the delay spread characteristics in the radio propagation paths, the selecting unit selects the bit interleaving mode or a symbol interleaving mode when the delay spread is larger than a predetermined value, and the chip interleaving mode when the delay spread is smaller than the predetermined value.

8. A radio communicating method in a radio communication OFCDM system adopting multiple carrier modulation and code spreading modulation methods, comprising:

a measuring step for measuring radio propagation path conditions in a radio receiver or a radio transmitter;

a selecting step, in the radio transmitter or the radio receiver, for selecting an interleaving mode out of a plurality of interleaving modes based on the measured result;

a transmitting step for configuring information symbols in both time and frequency directions in a pattern according to the selected interleaving mode, and transmitting the configured information symbols;

a receiving step, in the radio receiver, for receiving the transmitted information symbols; and a demodulation step for reconfiguring the received information symbols in both time and frequency directions in an inverse pattern of the pattern, wherein the selecting step selects an interleaving mode based at least one measured result of maximum Doppler frequency and delay spread characteristics in the radio propagation paths;

the selecting step selects an interleave mode based on the measured result of the maximum Doppler frequency in the radio propagation paths, the selecting step selects a bit interleaving mode or a symbol interleaving mode when the maximum Doppler frequency is larger than a predetermined value, and a chip interleaving mode when the maximum Doppler frequency is smaller than the predetermined value and when the selecting step selects an interleave mode based on the measured result of the delay spread characteristics in the radio propagation paths, the selecting step selects the bit interleaving mode or a symbol interleaving mode when the delay spread is larger than a predetermined value, and the chip interleaving mode when the delay spread is smaller than the predetermined value.

9. The radio communicating method as claimed in claim 8, wherein when the measuring step or the selecting step is done in the radio receiver, the measured result or the selected interleaving mode is communicated to the radio transmitter.

* * * * *